Oct. 13, 1959

C. H. HEUER ET AL 2,908,750

COLOR-KILLER SYSTEM

Filed Aug. 22, 1955

2 Sheets-Sheet 1

JOHN L. RENNICK
CHARLES H. HEUER
*INVENTORS.*

BY John J. Pederson

THEIR ATTORNEY.

JOHN L. RENNICK
CHARLES H. HEUER
*INVENTORS.*
BY John J. Pederson
THEIR ATTORNEY.

2,908,750

COLOR-KILLER SYSTEM

Charles H. Heuer, Glencoe, and John L. Rennick, Elmwood Park, Ill., assignors to Zenith Radio Corporation, a corporation of Delaware Application August 22, 1955, Serial No. 529,810

3 Claims. (Cl. 178—5.4)

Figure 1:
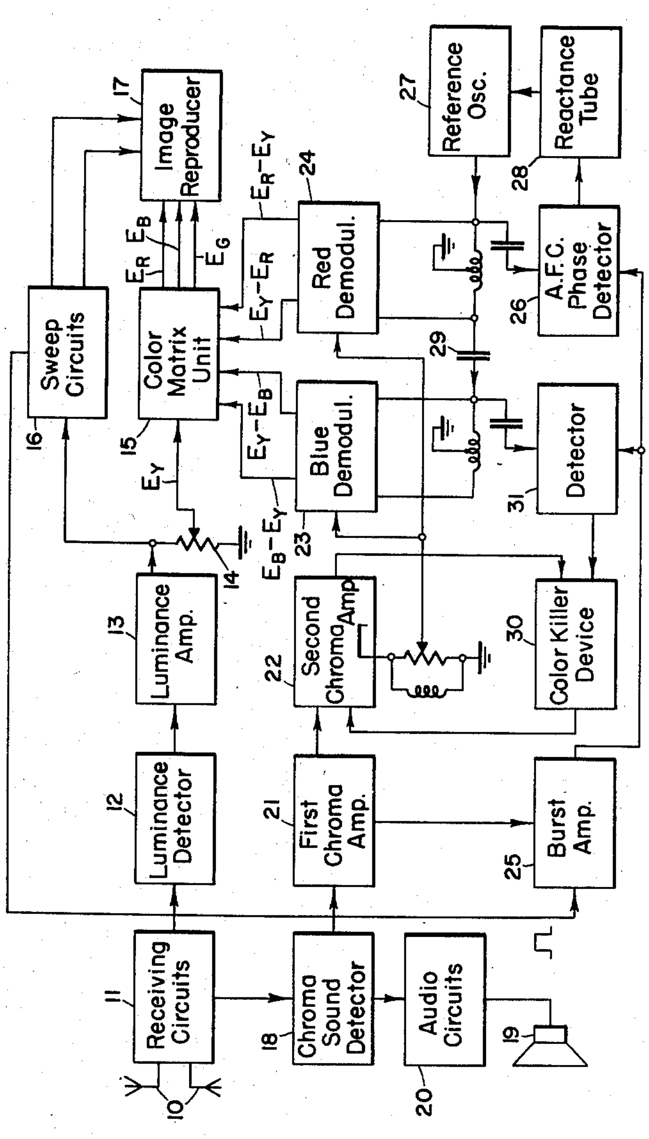

This invention is directed to new and improved circuits for color television receivers; more specifically, the invention is concerned with an automatic color-killer circuit for disabling the chrominance channel of a color television receiver under certain conditions.

Using the current United States standards, color television signals are compatible with monochrome transmissions; that is, a color telecast can be reproduced in black and white on a monochrome receiver and, conversely, a monochrome telecast may be reproduced by a color receiver. The color information in the color signal is transmitted as a synchronously-modulated subcarrier which is frequency-interleaved with the luminance information. A color synchronizing signal comprising bursts of a few cycles of color-subcarrier frequency signal is utilized to permit synchronous demodulation at the color receiver; these color bursts recur at the horizontal line-scanning frequency and are superimposed upon the "back porch" of the horizontal blanking pedestal.

It has been recognized that it may be desirable to disable the chrominance channel of the receiver, including the color demodulating system, during reproduction of a monochrome broadcast in order to prevent spurious color effects in the reproduced image. It is also advantageous to "kill" the chrominance circuits of the receiver whenever the local oscillator employed to develop the color reference signal utilized for synchronous detection of the color carrier signal is not operating in synchronism with the color burst, since under these conditions entirely erroneous and highly disturbing color effects may occur in the reproduced image. For example, under certain conditions a color telecast may be received but the color reference oscillator may still not be "locked" to the received color-synchronizing signals, in which case it is preferable to disable the chrominance channel of the receiver and reproduce the image in monochrome rather than to reproduce it with incorrect colors. In either of these two general situations, it is desirable that the color receiver operate to disable the chrominance circuitry automatically without requiring any action by the observer. To be completely effective, the disabling or "killer" action should be virtually instantaneous; that is, the transition time from color to monochrome operation should be negligible. More importantly, the color-killer circuit should operate in a completely unambiguous manner; that is, it should function to disable the chrominance channel of the receiver completely or to translate the full color carrier signal completely with no intermediate operational conditions being possible. Otherwise, the killer circuit may itself introduce serious disturbances and errors in the reproduced image. Although several arrangements have been proposed which effectively de-energize the receiver chrominance channel in the absence of color-synhcronizing signals and/or under operating conditions where the color reference oscillator is not properly synchronized, these known systems all have a tendency to suppress operation of the chrominance channel without disabling it completely, particularly under weak-signal conditions.

It is an object of the invention, therefore, to provide a new and improved color-killer circuit for a color television receiver which acts to disable the chrominance channel of that receiver automatically whenever no color-synchronizing signal is received.

It is a further object of the invention to provide a new and improved automatic color-killer circuit which disables a chrominance channel of a color television receiver whenever the color reference oscillator of that receiver is not properly synchronized with a received color-synchronizing signal.

It is a particular object of the invention to provide a new and improved automatic color-killer circuit for a color television receiver which is inherently incapable of ambiguous operation and acts to disable the chrominance circuitry of the receiver completely or to leave it completely operative without introducing transitional modes of operation.

It is another object of the invention to provide a new and improved automatic color-killer circuit which is substantially noise-immune.

It is a corollary object of the invention to provide a new and improved automatic color-killer circuit for a color television receiver which is relatively simple in construction and economical in manufacture.

In accordance with the invention a color television receiver for utilizing a received signal including a carrier color signal and a color synchronizing signal comprises a chrominance amplifier and a color-killer amplifier each of which includes an electron-discharge device having anode, cathode and control electrodes. The anode and control electrodes of the chrominance amplifier are cross-coupled to the control and anode electrodes, respectively, of the color-killer amplifier to constitute a flip-flop circuit having only two stable operating conditions in one of which the chrominance amplifier alone is conductive while, in the other, only the color-killer amplifier is conductive. Detector means, at least partially responsive to the presence of the color synchronizing signal in the received signal, generates an actuating signal. Finally, means are provided for coupling the detector means to at least one of the amplifiers to actuate the flip-flop circuit between its first and second operating conditions in response to the actuating signal.

Figure 2:
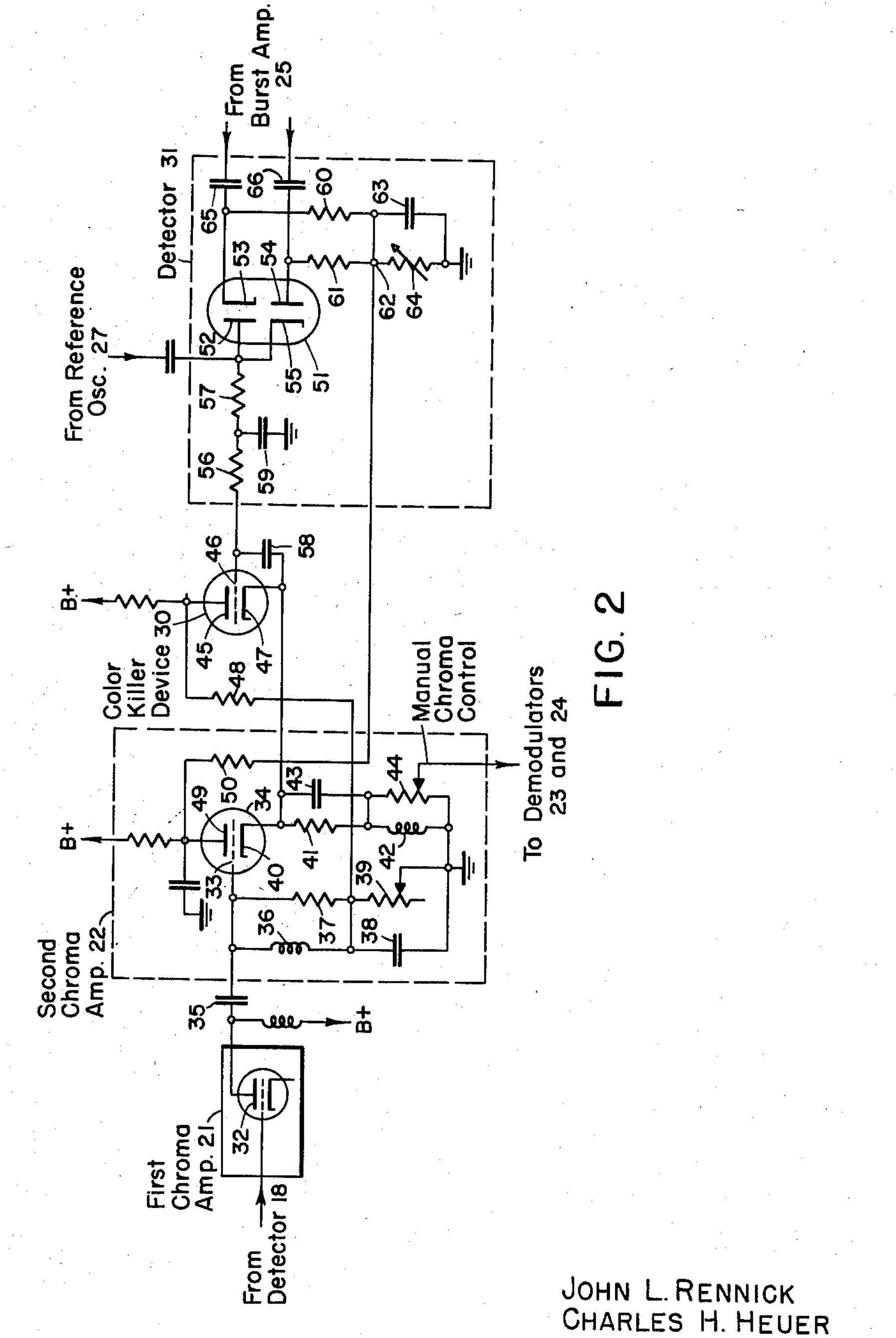

The features of the invention which are believed to be novel are set forth with particularity in the appended claims. The organization and manner of operation of the invention, together with further objects and advantages thereof, may best be understood by reference to the following description taken in conjunction with the accompanying drawings, in which like elements are identified by like numerals in each of the figures, and in which:

Figure 1 is a block diagram of a color television reproducer including an automatic color-killer circuit constructed in accordance with one embodiment of the invention; and Figure 2 is a detailed schematic drawing of a preferred embodiment of the invention.

The color television receiver illustrated in Figure 1 comprises an antenna 10 coupled to conventional receiving circuits 11 which may, for example, comprise the usual radio-frequency amplifier, first detector and intermediate-amplifier stages employed in most monochrome and color television receivers. Receiving circuits 11 are coupled to a luminance detector circuit 12 which, in turn, is connected to a luminance amplifier 13. The output stage of luminance amplifier 13, comprising a potentiometer 14, is coupled to a color matrix unit 15 and to the usual sweep circuits 16. Sweep circuits 16 are coupled to the deflection system of a color image reproducer 17 which may comprise any of the several known varieties of color television picture tube.

Receiving circuits 11 are further coupled to a chrominance and sound detector 18 which is coupled to a speaker 19 by conventional audio circuits 20. Second detector 18 is also coupled to a chrominance channel comprising a first chroma amplifier 21 and a second chroma amplifier 22; second chroma amplifier 22 is a cathode-follower stage and is coupled to a color demodulating system comprising a pair of synchronous detectors 23 and 24 designated as "blue" and "red" demodulators respectively. The demodulating system may comprise any of the several suitable known types of synchronous detectors capable of demodulating the carrier color signal included in a standard color telecast; a preferred type of color demodulating system is described in the copending application of Robert Adler and John L. Rennick, Serial No. 505,476, filed May 2, 1955, now Patent No. 2,779,818, granted Jan. 29, 1957 and assigned to the same assignee as the present invention. Each of the two synchronous detectors 23, 24 includes two output circuits; these output circuits are individually coupled to color matrix unit 15. Color matrix unit 15 in turn is coupled to image reproducer 17.

First chroma amplifier 21 is further coupled to a gated amplifier circuit designated as burst amplifier 25, and a gating signal input circuit couples sweep circuits 16 to the burst amplifier. The output of burst amplifier 25 is coupled to a phase detector 26 which is also coupled to a local color reference oscillator 27; the output stage of phase detector 26 is connected to a reactance tube 28 coupled to the oscillator circuit. Reference oscillator 27 is coupled to demodulator 24 and is also coupled to demodulator 23 by means of a capacitor 29 which is utilized to provide a 90° phase difference between the color reference signals applied to the two demodulators.

As thus far described, the color television receiver circuit of Figure 1 is quite conventional, except for the use of a cathode follower in the chroma amplifier; accordingly, a brief description of its operation will be adequate. A received signal is intercepted by antenna 10 and suitably amplified and detected in receiving circuits 11, after which it is supplied to second detectors 12 and 18. After detection in circuit 12, the video signal is applied to amplifier 13 and, after amplification, the synchronizing signal pulses are utilized in sweep circuits 16 to develop the usual horizontal- and vertical-frequency sweep signals which are supplied to image reproducer 17. At the same time, that portion of the detected signal generally representative of the luminance signal ($E_Y$) included in a color telecast is supplied to color matrix 15.

The detected signal output from second detector 18 is utilized by audio circuits 20 and speaker 19 to reproduce the sound portion of the received telecast. The output signal from second detector 18 is also translated through chroma amplifiers 21 and 22 to the demodulating system comprising detectors 23 and 24; in accordance with conventional practice, the frequency response chaarcteristics of the chroma amplifier stages may be made such that only the portion of the received signal generally corresponding to the carrier color signal and high-frequency luminance components is translated to the color demodulators. A color reference signal having the same frequency as the color subcarrier is supplied in proper phase to each of demodulators 23 and 24 to permit synchronous detection of the carrier color signal and develop four color difference output signals of the form $E_B—E_Y$, $E_Y—E_B$, $E_R—E_Y$, and $E_Y—E_R$ respectively. The color difference signals are supplied to matrix unit 15 where they are suitably combined in the proper ratios with luminance signal $E_Y$ to form primary color signals $E_R$, $E_B$ and $E_G$ which are utilized to control the operation of image reproducer 17. The color synchronizing signal included in the received telecast is amplified in gated amplifier 25 and is compared in phase and frequency with the reference signal from oscillator 27 in the AFC phase detector 26; the output of the phase detector is applied to reactance tube 28 to control the operation of the color reference oscillator in the usual manner.

The basic circuitry of the television receiver of Figure 1 is subject to substantial variation without in any way affecting operation of the invention. For example, demodulators 23 and 24 may be made to develop output signals corresponding to different color difference signal than those designated; for example, color difference signals of the form $E_I$, $E_Q$, or $E_G—E_Y$ may be developed. Moreover, color matrix unit 15 may be eliminated and image reproducer 17 may be controlled by direct application of the luminance and color difference signals to the picture tube in known fashion. If a sequential-display picture tube is utilized in image reproducer 17, additional circuitry may be required to gate the video signal inputs and to control the sequence of control presentation in the image reproducer. Any of these and similar modifications may be made in the color television receiver construction without affecting the invention in any way.

The color television receiver of Figure 1 includes an automatic color-killer circuit constructed in accordance with the invention and comprising a color-killer device 30 coupled to second chroma amplifier 22. In a color television receiver constructed in accordance with current practice and utilizing electron-discharge devices such as triodes, pentodes, etc., device 30 preferably comprises an ordinary triode; a conventional triode is also preferably employed in amplifier 22. On the other hand, when other electric discharge devices such as transistors are employed in the receiver circuitry and particularly in chroma amplifier 22, color-killer device 30 may comprise a device of this type. In either event, be it tube or transistor, color-killer device 30 is coupled to chroma amplifier 22 to form a flip-flop or multivibrator circuit which is actuatable between two different operating conditions. In the first of these two distinct operating conditions, chroma amplifier 22 is energized and translates that portion of the received signal including the carrier color signal to demodulating system 23, 24; in its second operating condition, the multivibrator circuit de-energizes chroma amplifier 22 and effectively kills the color channel of the receiver.

Of course, operation of the multivibrator color-killer system comprising circuits 22 and 30 requires a suitable source of actuating signals; that is, the flip-flop circuit must be triggered to disable the chroma amplifier section 22 whenever a monochrome telecast is being received. This may be accomplished by coupling a detector in the output of burst amplifier 25 to provide an actuating signal indicative of the presence or absence of color synchronizing signals in the received signal; this actuating signal is supplied to the multivibrator circuit to trigger it between its two operating conditions. A simple peak detector may be employed for this purpose and may be coupled between burst amplifier 25 and color-killer device 30 as indicated by detector circuit 31 in Figure 1. Alternatively, the actuating signal may be derived from one side of the color reference AFC phase detector 26.

Substantially improved operating results can be achieved, however, by employing a particular type of detector circuit to develop the actuating signal. Preferably, detector 31 comprises a synchronous detector circuit of the same type as employed for AFC phase detector 26. When a synchronous detector is employed in circuit 31, the color synchronizing signal from burst amplifier 25 is compared in phase and frequency with the reference signal developed by oscillator 27; in the illustrated embodiment, the reference signal input is taken from the input to blue demodulator 23 to inject the reference signal into detector 31 in the same phase as the color synchronizing signal. Synchronous detector 31 then generates an actuating signal having a first amplitude range whenever oscillator 27 is locked in frequency to the color synchronizing signal and is not too far displaced in phase from the desired relationship; the actuating signal has a predetermined different amplitude range whenever the color reference and color synchronizing signals are not in proper synchronism. With an actuating signal of this type, the color-killer multivibrator comprising circuits 22 and 30 is actuated to translate input signals to demodulating system 23, 24 only when the color synchronizing signal is present and bears a predetermined frequency relationship to the color reference signal. Consequently, on monochrome telecasts the chrominance channel comprising amplifier 22 and demodulating system 23, 24 is effectively disabled and only the conventional video channel provided by luminance circuits 12 and 13 controls image reproducer 17. The chrominance channel is also de-energized or disabled whenever the receiver is utilizing a color telecast but the color reference signal generator, oscillator 27, is not locked to the received color synchronizing signal. A color telecast received under these conditions, which prevent proper color presentation, is nevertheless reproduced intelligibly and usefully in black and white. Whenever a color telecast is being received and the color reference oscillator is properly synchronized to the received color bursts, multivibrator 22, 30 is conditioned by the actuating signal from detector 31 to permit translation of the carrier color signal through the amplifier stage 22 to demodulators 23 and 24 for complete color operation.

Figure 2 comprises a detailed schematic diagram of a preferred color-killer system constructed in accordance with the invention; those portions of the circuit corresponding to particular units shown in Figure 1 are identified by corresponding numbers. The anode 32 of first chroma amplifier 21 is coupled to the control electrode 33 of a triode 34 included in second chroma amplifier 22; the coupling circuit comprises a coupling capacitor 35 connected in series between anode 32 and control grid 33 and a filter section comprising an inductance 36 and a load resistor 37 connected in parallel with each other. One terminal of each of impedances 36 and 37 is connected to control grid 33, whereas the other terminal of each of the impedances is effectively grounded for video-frequency signals through a by-pass capacitor 38. A variable resistor 39 is connected in parallel with the by-pass condenser to serve as a load resistor for D.C. and for the low-frequency actuating signal.

The cathode 40 of tube 34 is connected to ground through a low-frequency or D.C. impedance comprising a resistor 41 connected in series with an inductance coil 42. Resistor 41 is shunted at high frequencies by a capacitor 43, and a radio-frequency output resistance comprising a potentiometer 44 is connected in shunt with coil 42. Potentiometer 44 serves as a manual control for chrominance amplification and is coupled to color demodulating system 23, 24 (Figure 1).

The color-killer device 30 in this embodiment of the invention comprises a conventional triode including an anode 45, a control electrode 46 and a cathode 47. Anode 45 is connected to the input circuit of cathode follower 22 by means of a resistor 48. Cathode 47 is connected to cathode 40 of chroma amplifier tube 34, and control grid 46 is coupled back to the anode 49 of tube 34 through detector circuit 31 and a coupling resistor 50.

Detector 31, in the preferred embodiment of Figure 2, comprises a conventional double-diode synchronous detector including two diode sections which may be enclosed in a single envelope 51. The anode 52 of one diode section is connected to the cathode 55 of the other diode section; these two electrodes are also coupled to reference oscillator 27 (Figure 1). Electrodes 52 and 55 are further coupled to control electrode 46 by means of a resistance-capacitance filter network comprising resistors 56 and 57 and capacitors 58 and 59. The cathode 53 associated with anode 52 is connected to anode 49 of chroma amplifier tube 34 by a resistor 60, and the anode 54 of the other diode section is connected to plate 49 by a coupling resistor 61, resistors 60 and 61 each being connected in series with coupling resistor 50. The common terminal 62 of resistors 50, 60 and 61 is by-passed to ground by a capacitor 63, and a variable bias-control resistor 64 is connected in parallel with the by-pass condenser. A pair of capacitors 65 and 66 are employed to couple cathode 53 and anode 54 of the phase detector in push-pull relationship to burst amplifier 25.

In operation, the two triodes 34 and 30 operate as a bistable multivibrator, since the output electrode of each tube is interconnected with the input electrode of the other; in one of the two stable operating conditions of the system, tube 34 is conductive whereas in the alternative stable operating condition tube 30 conducts. Synchronous detector 31, which is connected in the feedback circuit from anode 49 to control grid 46, is utilized to generate an actuating signal by comparing the color reference signal from oscillator 27 phase- and frequency-wise with the color synchronizing signal from burst amplifier 25. When oscillator 27 is not synchronized to the incoming color burst, the voltage across the synchronous detector from terminal 62 to control grid 46 is effectively zero. Resistors 64 and 39 are adjusted so that, with no output voltage from the synchronous detector, color-killer tube 30 is conductive and no signal is translated to demodulators 23 and 24. When the reference oscillator is operating in synchronism with a received color synchronizing signal, there is a substantial voltage difference between terminal 62 and grid 46; as soon as this condition is attained, the multivibrator circuit comprising tubes 30 and 34 acts extremely rapidly to change from the condition in which tube 30 conducts to the alternate condition in which only tube 34 conducts and in which the color carrier signal is translated from amplifier 21 to demodulators 23 and 24. Expressed somewhat differently, synchronous detector 31 develops an actuating signal having two distinct amplitude ranges, one of which indicates that color reference oscillator 27 is synchronized with a received color burst and the other of which indicates that no color burst is being received or that the color reference oscillator is not locked to the received color synchronizing signal. This actuating signal is applied to the multivibrator to trigger either of tubes 30 and 34 into operation and thereby automatically control the chrominance channel of the television receiver so that it is disabled except when conditions are proper for color operation.

The actuating signal developed by detector 31 is not a pulse-type signal; rather, it comprises a D.C. actuating voltage or current which varies in accordance with substantial changes in operation of the color reference circuitry. Consequently, it is not necessary to employ a bistable circuit in the color-killer circuit comprising units 22 and 30. Rather, a monostable or "one shot" multivibrator circuit arrangement may be employed in intercoupling these two circuits, although a bistable circuit is perhaps somewhat better from the standpoint of speed of response.

The synchronous detector circuit shown in Figure 2 is preferable to a conventional peak detector arrangement because it is substantially noise-immune. Moreover, the arrangement shown provides automatic monochrome operation under weak-signal conditions where the received color synchronizing signal is inadequate to lock in the color reference oscillator in addition to killing the chrominance channel for monochrome telecasts. The multivibrator circuit comprising tubes 30 and 34 is extremely rapid and positive in operation and cannot be actuated to a condition in which the chrominance channel is only partially disabled; the color-killer cannot, therefore introduce color distortion into the reproduced image. Moreover, the particular circuit illustrated in Figure 2 provides a convenient and useful manual control for the chrominance channel in potentiometer 44.

While particular embodiments of the present invention have been shown and described, it is apparent that changes and modifications may be made without departing from the invention in its broader aspects. The aim of the appended claims, therefore, is to cover all such changes and modifications as fall within the true spirit of the scope of the invention.

We claim:

1. A color television receiver for utilizing a received signal including a carrier color signal and a color synchronizing signal comprising: a chrominance amplifier including an electron discharge device having anode, cathode, and control electrodes, a color-killer amplifier likewise including an electron discharge device having anode, cathode, and control electrodes; cross-coupling connections from said anode and control electrodes of said chrominance amplifier to said control and anode electrodes, respectively, of said color-killer amplifier constituting therewith a flip-flop circuit having only two stable operating conditions in one of which said chrominance amplifier alone is conductive and in the other of which said color-killer amplifier alone is conductive; detector means, at least partially responsive to the presence of said color synchronizing signal in a received signal, for generating an actuating signal; and means coupling said detector means to at least one of said amplifiers to actuate said flip-flop circuit between its aforesaid first and second operating conditions in response to said actuating signal.

2. A color television receiver for utilizing a received signal including a carrier color signal and a color synchronizing signal comprising: a color reference generator for developing a color reference signal synchronized in phase and frequency with said color synchronizing signal; a chrominance amplifier including an electron discharge device having anode, cathode, and control electrodes; a color-killer amplifier likewise including an electron discharge device having anode, cathode, and control electrodes; cross coupling connections from said anode and control electrodes of said chrominance amplifier to said control and anode electrodes, respectively, of said color-killer amplifier constituting therewith a flip-flop circuit having only two stable operating conditions in one of which said chrominance amplifier alone is conductive and in the other of which said color-killer amplifier alone is conductive; detector means, responsive to variations in synchronism between said color reference signal and said color synchronizing signal, for generating an actuating signal having a first amplitude range indicative of a predetermined condition of synchronism between said color reference and said color synchronizing signal and a second amplitude range indicative of asynchronism therebetween; and means coupling said detector means to at least one of said amplifiers to actuate said flip-flop circuit between its aforesaid first and second operating conditions in response to said actuating signal.

3. A color television receiver for utilizing a received signal including a carrier color signal and a color synchronizing signal comprising: a color reference generator for developing a color reference signal synchronized in phase and frequency with said color synchronizing signal; a chrominance amplifier including an electron discharge device having anode, cathode, and control electrodes; a color-killer amplifier likewise including an electron discharge device having anode, cathode, and control electrodes; cross coupling connections from said anode and control electrodes of said chrominance amplifier to said control and anode electrodes of said color-killer amplifier constituting therewith a flip-flop circuit having only two stable operating conditions in one of which said chrominance amplifier alone is conductive and in the other of which said color-killer amplifier alone is conductive; a synchronous detector, coupled to said color reference generator, for comparing said color reference and said color synchronizing signals to generate an actuating signal having a first amplitude range indicative of synchronism between said color reference and color synchronizing signals and a second amplitude range indicative of asynchronism therebetween; and means coupling said detector means to at least one of said amplifiers to actuate said flip-flop circuit between its aforesaid first and second operating conditions in response to said actuating signal.

References Cited in the file of this patent

UNITED STATES PATENTS

| | | |
|---|---|---|
| 2,681,379 | Schroeder | June 15, 1954 |
| 2,736,765 | Lohman | Feb. 28, 1956 |
| 2,744,155 | Kihn | May 1, 1956 |
| 2,752,417 | Pritchard | June 26, 1956 |
| 2,759,993 | Loughlin | Aug. 21, 1956 |
| 2,813,147 | Richman | Nov. 12, 1957 |

OTHER REFERENCES

RCA Color Television Receiver Model CT–100 Service Manual, pages 5, 32 and 33, published March 31, 1954.